US007664740B2

(12) United States Patent
Starbuck et al.

(10) Patent No.: US 7,664,740 B2
(45) Date of Patent: Feb. 16, 2010

(54) AUTOMATICALLY DISPLAYING KEYWORDS AND OTHER SUPPLEMENTAL INFORMATION

(75) Inventors: Bryan T Starbuck, Redmond, WA (US); Ojiakonobi Udezue, Redmond, WA (US); Stephen Lardieri, Bellevue, WA (US); Manish M Anand, Bellevue, WA (US); Joshua T. Goodman, Redmond, WA (US); Alexei V Bocharov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 81 days.

(21) Appl. No.: 11/426,509

(22) Filed: Jun. 26, 2006

(65) Prior Publication Data

US 2007/0299815 A1    Dec. 27, 2007

(51) Int. Cl.
   *G06F 7/00* (2006.01)
(52) U.S. Cl. .......................................................... 707/3
(58) Field of Classification Search ....................... 707/3
   See application file for complete search history.

(56) References Cited

U.S. PATENT DOCUMENTS

| | | | |
|---|---|---|---|
| 5,848,396 A | 12/1998 | Gerace | |
| 6,029,195 A | 2/2000 | Herz | |
| 6,654,735 B1 | 11/2003 | Eichstaedt et al. | |
| 6,771,290 B1 | 8/2004 | Hoyle | |
| 7,028,072 B1 | 4/2006 | Kliger et al. | |
| 2002/0010747 A1 | 1/2002 | Jaehyuk-Hwang | |
| 2002/0022956 A1* | 2/2002 | Ukrainczyk et al. | ............ 704/9 |
| 2004/0059712 A1 | 3/2004 | Dean et al. | |
| 2004/0068486 A1* | 4/2004 | Chidlovskii | ..................... 707/3 |
| 2004/0177015 A1* | 9/2004 | Galai et al. | ................... 705/35 |
| 2005/0222903 A1 | 10/2005 | Buchheit et al. | |
| 2005/0222981 A1* | 10/2005 | Lawrence et al. | .............. 707/3 |
| 2005/0278317 A1 | 12/2005 | Gross et al. | |
| 2006/0047649 A1* | 3/2006 | Liang | ............................ 707/4 |

FOREIGN PATENT DOCUMENTS

| | | |
|---|---|---|
| WO | WO0122261 | 3/2001 |
| WO | WO0161556 | 8/2001 |

OTHER PUBLICATIONS

Deng et al., "Local Web Advertisement Through Dynamic Active Proxy", IEEE, 2000, pp. 1183-1186.
Loia et al., "Similarity-based Agents for EMail Mining", IEEE, 2001, pp. 417-422.
Teevan et al., "Personalizing Search via Automated Analysis of Interests and Activities", SIGIR, Aug. 15-19, 2005, pp. 449-456.

* cited by examiner

*Primary Examiner*—Charles Rones
*Assistant Examiner*—Fazlul Quader
(74) *Attorney, Agent, or Firm*—Lee & Hayes, PLLC

(57) ABSTRACT

Various embodiments can utilize information that is displayed for a user to automatically generate a list of keywords and use that list as a means to display supplemental information that is relevant to the keywords. In at least some embodiments, the displayed information is analyzed using an extraction algorithm to identify words or, more generally, character strings of interest. If these words or character strings of interest are determined to constitute relevant search terms or "keywords", then a special user interface portion can be used to display this supplemental information along with the information that is already displayed for the user. This supplemental information can include the search terms themselves, ads that pertain to the search terms, and/or search results that have been ascertained from a web search engine.

17 Claims, 5 Drawing Sheets

AUTOMATICALLY DISPLAYING KEYWORDS AND OTHER SUPPLEMENTAL INFORMATION

BACKGROUND

The Internet has made a wide variety of information available to various types of users. For example, using a search engine, end users can physically enter search terms and retrieve information that is relevant to them. Other types of users, such as business users, can use the Internet to target market individuals by, for example, having ads displayed in a browser window, where such ads are relevant to search terms that the individual may have entered. For example, if an individual enters the search term "ski resort", then some business models may display, in connection with the search results, ads that pertain to ski resorts or perhaps travel agencies.

Yet, the user experience is not all that it could be and efforts continue to enhance it.

SUMMARY

Various embodiments can utilize information that is displayed for a user to automatically generate a list of keywords and use that list as a means to display supplemental information that is relevant to the keywords. In at least some embodiments, the displayed information is analyzed using an extraction algorithm to identify words or, more generally, character strings of interest. If these words or character strings of interest are determined to constitute relevant search terms or "keywords", then a special user interface portion can be used to display this supplemental information along with the information that is already displayed for the user. This supplemental information can include the search terms themselves, ads that pertain to the search terms, and/or search results that have been ascertained from a web search engine. Using the displayed search terms, at least some embodiments can allow a user to click on a different search term to automatically display a new set of supplemental data, such as new ads or search results that pertain to the term on which the user clicked.

DETAILED DESCRIPTION

Overview

Various embodiments can utilize information that is displayed for a user to automatically generate a list of keywords and use that list as a means to display supplemental information that is relevant to the keywords. In at least some embodiments, the displayed information is analyzed using an extraction algorithm to identify words or, more generally, character strings of interest. If these words or character strings of interest are determined to constitute relevant search terms or "keywords", then a special user interface portion can be used to display this supplemental information along with the information that is already displayed for the user. This supplemental information can include the search terms themselves, ads that pertain to the search terms, and/or search results that have been ascertained from a web search engine. Using the displayed search terms, at least some embodiments can allow a user to click on a different search term to automatically display a new set of supplemental data, such as new ads or search results that pertain to the term on which the user clicked.

In the discussion below, the following sections are provided. First, a section entitled "Exemplary Environment" is provided and describes an exemplary environment in which the inventive embodiments can be employed. Next, a section entitled "Exemplary Embodiment" is provided and describes aspects of one embodiment. Following this, a section entitled "Implementation Example" is provided and describes a particular implementation instance or example. In this section, various features that can enhance a user's experience are described under their own sub-headings.

Exemplary Environment

Figure 1:
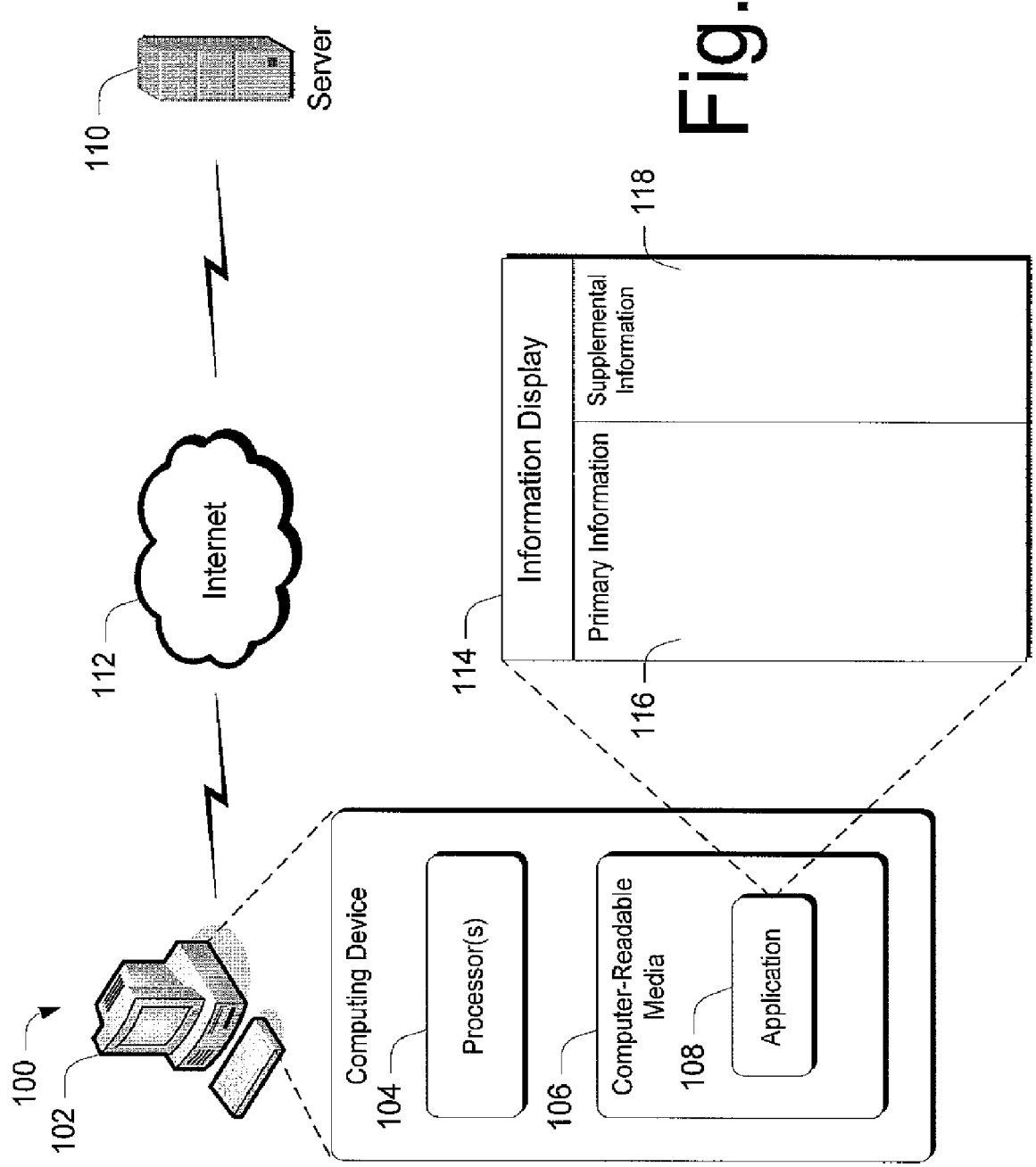
FIG. 1 illustrates an exemplary environment, in accordance with one embodiment, in which the inventive embodiments can be employed.

FIG. 1 illustrates an exemplary environment, in accordance with one embodiment, in which the inventive embodiments can be employed generally at 100.

Here, system 100 includes a client computing device 102 which includes one or more processors 104 and one or more computer-readable media 106 on which executable, computer-readable instructions reside. In this example, computer-readable media 106 includes code that implements one or more applications 108 such as a web browser, RSS reader, email application, instant messenger application, word processing application, spreadsheet application and the like. The various embodiments described below can be implemented in connection with any suitable type of application, such as those mentioned above and others.

In the illustrated and described embodiment, application 108 (or another application that works in concert with the application) is configured to communicate with one or more servers 110 via a network such as the Internet 112. In practice, web content can be retrieved from server 110 and rendered for a user, as will become apparent below.

It is to be appreciated and understood that while computing device 102 is illustrated as a desk top computing device, other computing devices such as laptop devices, notebook devices, handheld devices and the like can be utilized without departing from the spirit and scope of the claimed embodiments.

In at least some embodiments, application 108 is configured to provide an information display 114 for the user. The information display 114 can include any suitable type of information. In the illustrated and described embodiment, the information display 114 includes a display for primary information 116 and a display for so-called supplemental information 118 which is automatically generated from the primary information 116, as will become apparent below.

Primary information can be considered as information that a user, at least initially, accesses using the application. For example, when the application comprises a web browser, such primary information can include a web page to which the user has currently browsed. Alternately or additionally, when the application comprises an RSS reader, such primary information can include a particular RSS feed that a user is currently consuming or a collection of feeds the user is browsing. Alternately or additionally, when the application comprises an email application or instant messenger application, such primary information can comprise a current email message or instant message respectively. Alternately or additionally, when the application comprises a word processing application or spreadsheet application, such primary information can comprise a document the user is reviewing.

Supplemental information can be considered as information that is relevant, in some way, to the primary information. Such supplemental information can include, by way of example and not limitation, keywords that have been extracted from the primary information, ads that pertain to keywords that have been extracted and/or web search results that have been ascertained for one or more of the keywords.

In this manner, as will become apparent below, a user's present application context is used, in a sense, as a springboard to provide a richer user experience that automatically leverages vast amounts of information that is available over the Internet.

Exemplary Embodiment

Figure 2:
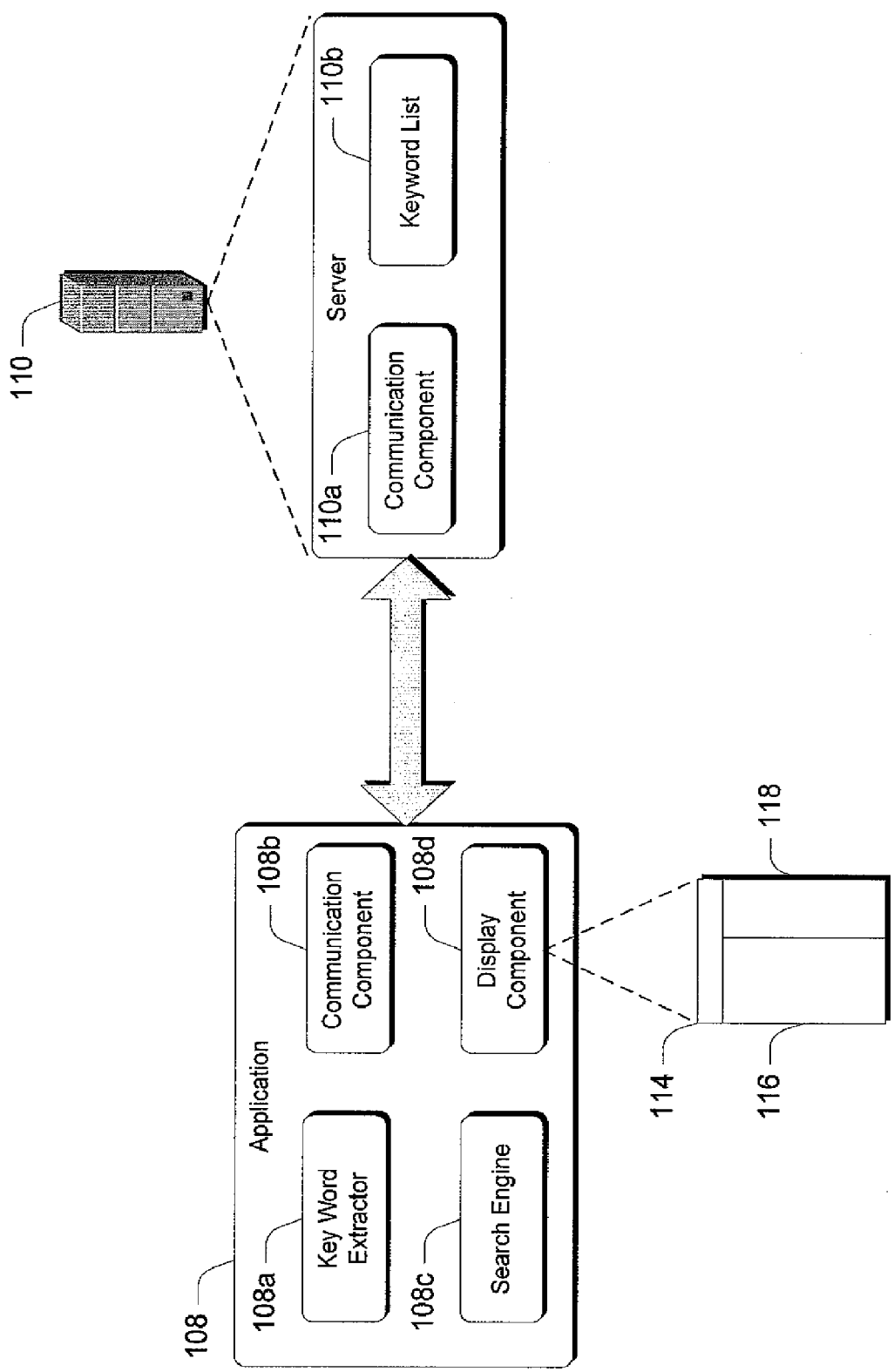
FIG. 2 illustrates an exemplary application and server in accordance with one embodiment.

FIG. 2 illustrates application 108 and server 110 in a little more detail in accordance with one embodiment.

In this example, application 108 includes or otherwise has access to a keyword extractor 108a, a communication component 108b, a search engine 108c and a display component 108d.

Keyword extractor 108a is configured to analyze information and extract keywords from the information. In the example above, this information can typically reside as the primary information that is displayed for the user. So, for example, if application 108 is an email application, such primary information might be the current email message that the user is reading. As such, the keyword extractor would operate upon that current email message. Any suitable keyword extractor component can be used. In but one embodiment, the keyword extractor utilizes term frequency-inverse document frequency (tf-idf) techniques to identify keywords. Term frequency-inverse document frequency utilizes weights that describe the relevance of a particular word or collection of words. The term frequency in a given document gives a measure of the importance of the term within the particular document. This is typically the number of occurrences of the considered term in the document of interest divided by the number of occurrences of all terms in the document. The inverse document frequency is a measure of the general importance of the term (typically, it is the logarithm of the number of all documents divided by the number of documents containing a particular term).

Thus, the tf-idf is the product of the term frequency and the inverse document frequency. A high weight in the tf-idf is reached by high term frequency in a given document and a low document frequency of the term in the whole collection of documents. Thus, the weights tend to filter out common terms. There are other ways to compute the tf-idf with the above description constituting but one way of computing it.

Accordingly, the output of the keyword extractor 108a is a collection of words from a document, each with a particular weight assigned to each word.

Communication component 108b is configured to enable communication with, for example, server 110. Any suitable means of communication or protocols can be utilized.

Search engine 108c is embodied as a web search engine. Any suitable type of search engine can be utilized. For example, the search engine could comprise an MSN search engine, Google search engine, Yahoo search engine and the like. The operation of search engines is generally known and understood. In this example, the search engine uses communication component 108b to execute web searches.

Display component 108d can be considered as the user interface component of application 108. This component not only enables information to be presented to the user, such as information display 114, but it also allows the user to interact with the displayed information, as by clicking on particular displayed keyword or selecting displayed ads or search results, as will be appreciated by the skilled artisan.

Server 110 includes a communication component 110a and a database that includes a keyword list 110b.

Communication component 110a is configured to permit communication with application 108 using any suitable type of communication or protocol.

Keyword list 110b is a collection of commonly or frequently used search terms or keywords. Such keywords tend to be those keywords or types of keywords that are commonly or frequently the subject of web searches.

In operation, keyword extractor 108a processes particular primary information of interest, such as an email message or document on which a user is currently working, and extracts from it keywords. These keywords are then compared with keyword list 110b to identify those terms that likely constitute search terms. Having thus identified likely search terms, display component 108d displays the keywords to the user as part of the supplemental information 118. In addition, search engine 108c can use the displayed keywords to execute a web search of the keywords. This search can identify relevant search results and/or relevant ads that pertain to the individual keywords. These search results and/or ads can then be displayed for the user as part of the supplemental information.

In this manner, a user can work on or otherwise access particular information such as a document, and have relevant keywords, search results and/or ads automatically displayed for them. Then, by clicking on the individual keywords, the user can cause the displayed supplemental information to change automatically. In this manner, the user experience is greatly enhanced by using the user's present application context as a springboard to provide a richer user experience that automatically leverages vast amounts of information, such as search results and/or ads, that is available over the Internet.

Figure 3:
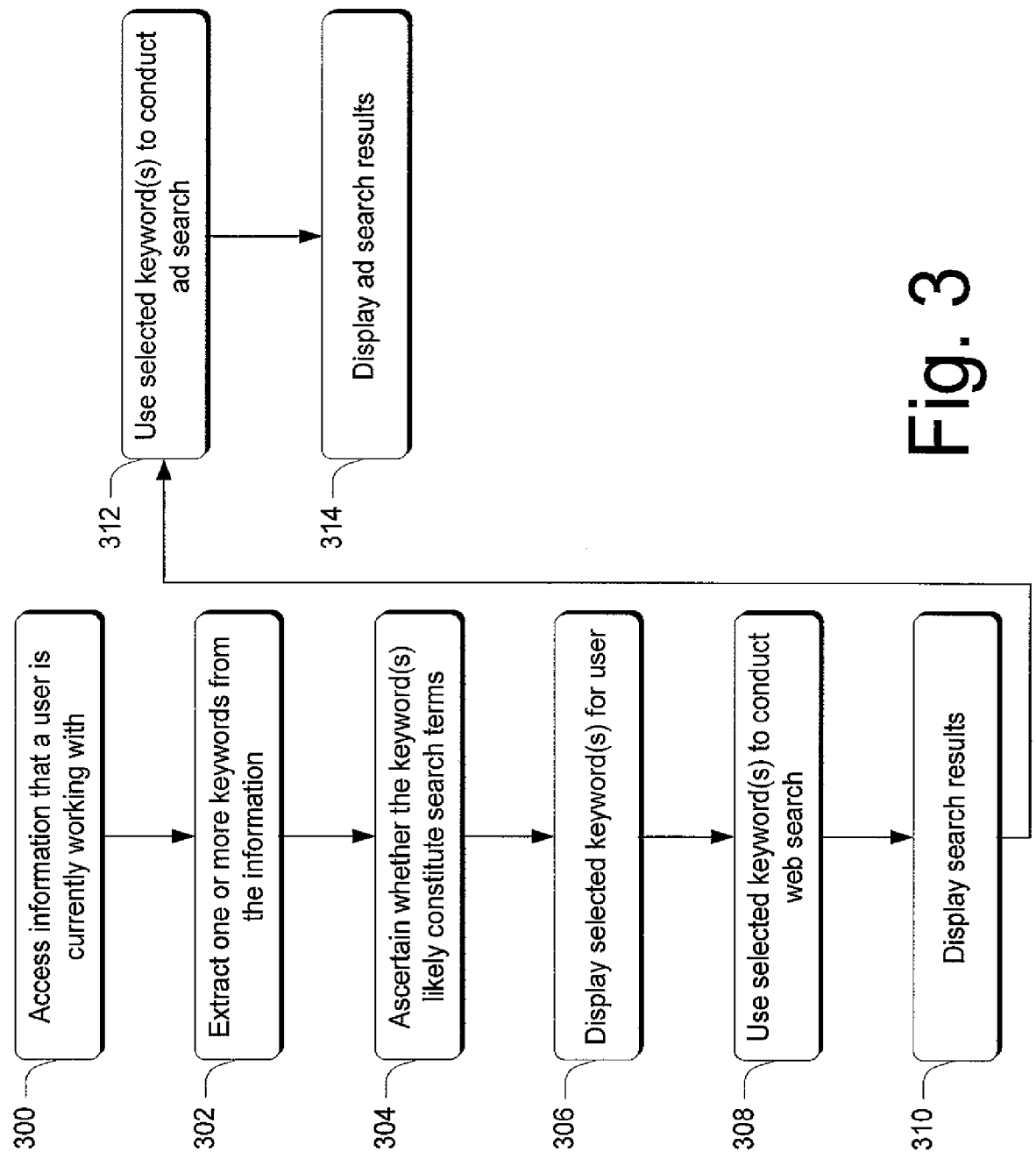
FIG. 3 is a flow diagram that describes steps in a method in accordance with one embodiment.

FIG. 3 is a flow diagram that describes steps in a method in accordance with one embodiment. The method can be implemented in connection with any suitable hardware, software, firmware or combination thereof. In at least some embodiments, the method can be implemented using, at least in part, an application such as application 108 (FIG. 1).

Step 300 accesses information that a user is currently working with. Any suitable type of information can be utilized and can include, by way of example and not limitation, documents such as word processing documents and/or messages such as email or instant messaging messages. Step 302 extracts one or more keywords from the information. Any suitable method can be used to extract keywords from the information. But one example of how this can be done is given above, i.e. using tf-idf. Other methods can be used without departing from the spirit and scope of the claimed subject matter.

Step 304 ascertains whether the keyword(s) likely constitute search terms. This step can be implemented in any suitable way. For example, in one embodiment, extracted keywords can be compared with a list of key search terms that is maintained by a suitably configured server. Step 306 displays selected keyword(s) for the user, also referred to as supplemental information above. In this step, those words that have been identified as likely being search terms are displayed for the user. The keywords can be displayed in order of the weights that were assigned in the extraction process. Thus, the highest scoring keywords might be displayed before lower scoring keywords down to a defined weight threshold.

Step 308 uses selected keyword(s) to conduct a web search. This step can be accomplished by, for example, using a suitably configured search engine, such as search engine 108c (FIG. 2). Step 310 displays the search results for the user, also referred to as supplemental information above. This step can be accomplished by contemporaneously displaying the supplemental information with or along side the primary information that the user is currently viewing.

Step 312 uses selected keyword(s) to conduct an ad search. This step can be accomplished by using the keyword(s) as the subject of a search of a relevant database that includes ads, such as text ads, that pertain to the particular words. Step 314 displays the ad search results for the user, also referred to as supplemental information above. This step can be accomplished by contemporaneously displaying the supplemental information with or along side the primary information that the user is currently viewing.

Figure 4:
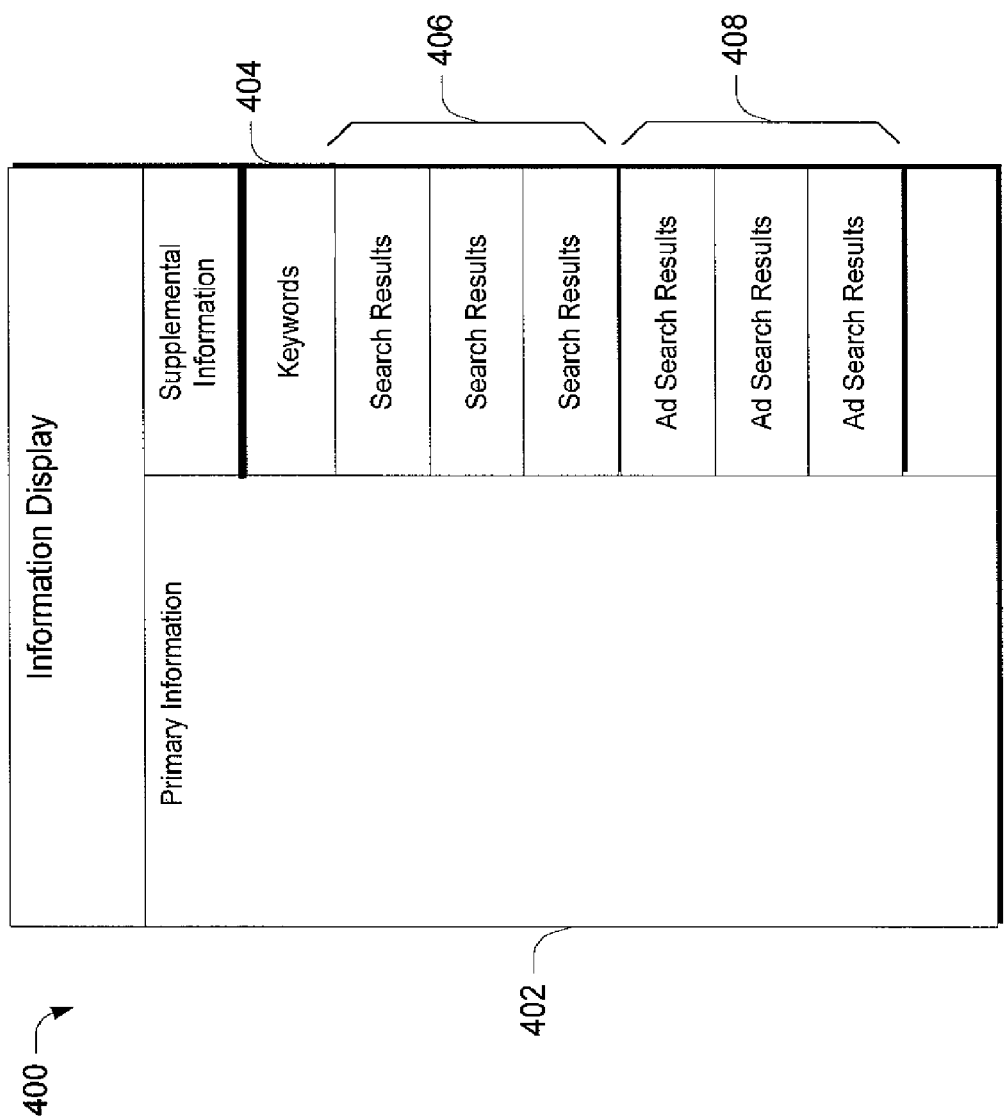
FIG. 4 illustrates an exemplary information display in accordance with one embodiment.

In practice, in at least some embodiments, the user interface that is presented to the user can take the form of the one shown in FIG. 4 generally at 400. Here, the user interface 400 includes a portion 402 for primary information, and individual portions 404, 406, and 408 for supplemental information. In this specific example, portion 404 is an area in which keywords are displayed, portion 406 is an area in which search results related to one or more keywords are displayed, and portion 408 is an area in which one or more ads related to one or more keywords are displayed. In at least some embodiments, as a user clicks on the individual keywords, the search results and ads displayed in portions 406, 408 respectively, change.

Implementation Example

In the following implementation example, an application in the form of an email application is used. This is for illustrative purposes and is not intended to limit application of the claimed subject matter to only email applications. Rather, other applications, such as those mentioned above and others, can be utilized without departing from the spirit and scope of the claimed subject matter.

Figure 5:
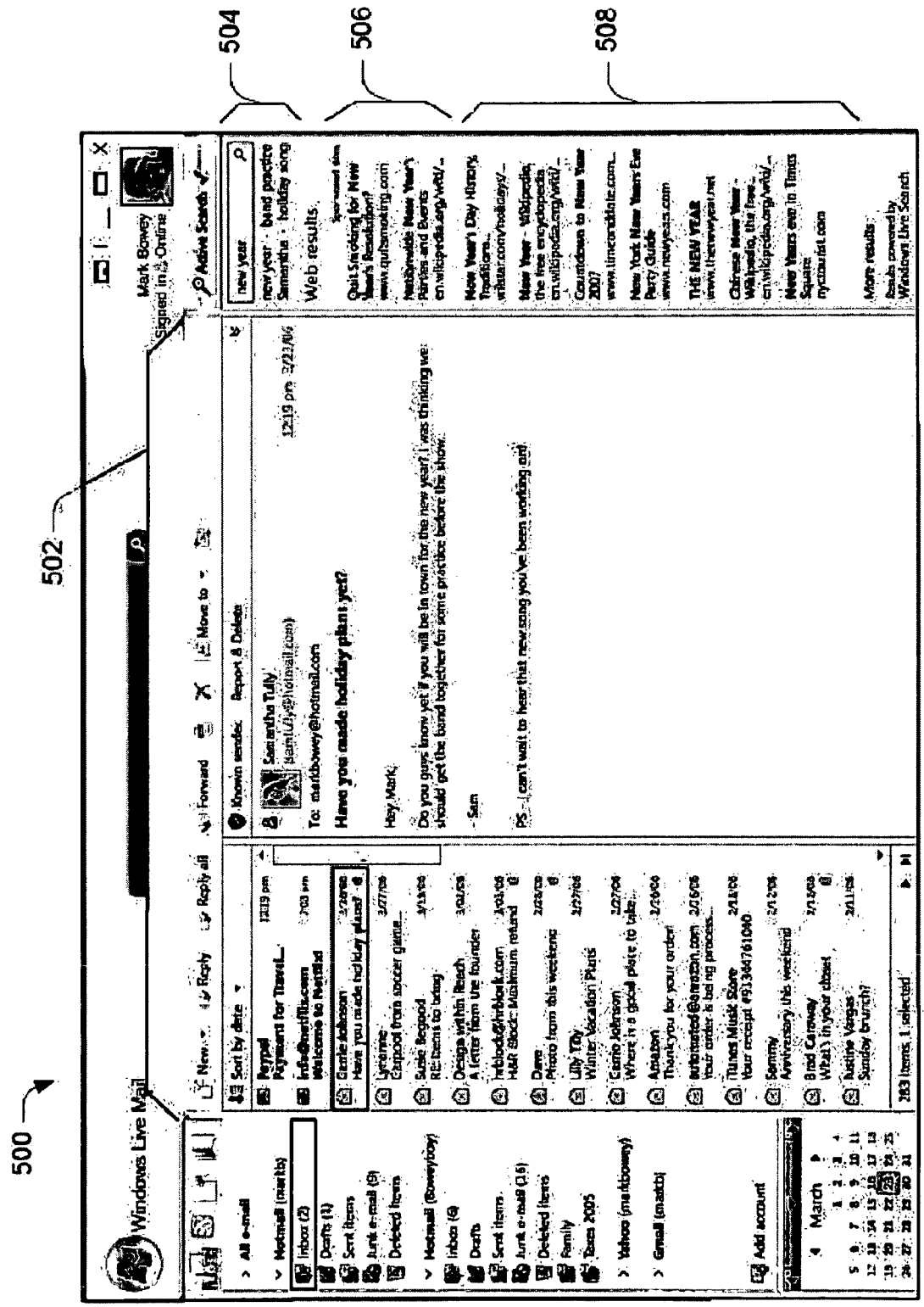
FIG. 5 illustrates an exemplary user interface in accordance with one embodiment.

FIG. 5 illustrates an exemplary user interface that is presented to a user in accordance with one embodiment generally at 500. In this example, primary information in the form of email messages is displayed in user interface portion 502. There, a list of email messages in the user's inbox is provided, along with a current email message of interest which is being viewed by the user. Notice also that supplemental information associated with the current email message of interest is also displayed responsive to the user selecting the current email message. In this example, user interface portion 504 includes keywords that have been identified from the email message as relevant search terms. User interface portion 506 includes associated search results and user interface portion 508 includes associated ad results.

In the discussion that follows, a number of sub-headings are provided and pertain to individual features that can be incorporated with the above-described functionality to provide an even more robust user experience.

Using Personal Names to Derive Supplemental Information

In at least some embodiments, personal names that are used in a document, such as an email message, can form a basis by which supplemental information is identified and displayed for the user. Personal names can occur within a document at any location. In the email context, these names can occur in the body of the message or in the "From:", "To:" and "CC:" fields.

In the event the name is not a full, proper name (such as an email address), then at least some embodiments can attempt to resolve the partial name or email address into a full name. This can be accomplished by, for example, using the user's address book, contacts list, buddy list and the like. Once the name has been resolved, it can be displayed as a keyword in the supplemental information. By clicking on this name, the user can access web information that is associated with this name and which is displayed in the results portion of the user interface. For example, clicking on a full name might present results that include that person's blogs, RSS feeds, articles about that person, or other user-published content associated with that person.

The partial name to full name mappings can now be cached across multiple messages so that the fill name can be utilized when it appears in other messages.

Cross-Indexing Contacts to Find/Create/Reinforce Keywords

In some embodiments, a particular keyword may not be assigned a weight that allows it to be immediately displayed for the user. For example, if the word is identified as a keyword but not a likely search term, then the word may receive a weight that prevents it from being displayed for the user. Yet, in particular contexts, this keyword may have a heightened level of relevance for that particular user.

Accordingly, in this embodiment, a multiplier is determined for identified keywords based on the relevance of the individual keywords relative to email messages that are associated with the contact from which the email message was received. The multiplier determines how much the keyword weight will increase if contact cross-indexing finds a high correlation of a particular keyword in messages from this contact.

Thus, in this embodiment, for the particular contact from which the email message is received, email messages that pertain to that contact are located. Such messages can be those in which the contact appears in the "From:" field, those in which the contact appears in the "To:" field, or in which the contact appears in the "CC:" field. Once these messages are located, for each keyword, a ratio is determined and describes how that keyword appears in that particular set of messages. From this ratio, a multiplier is derived and used to increase or decrease the weight of the associated keyword in the context of the current message.

Cross-Indexing Messages to Find/Create/Reinforce Keywords

In some embodiments, a particular keyword may not be assigned a weight that allows it to be immediately displayed for the user. For example, if the word is identified as a keyword but not a likely search term, then the word may receive a weight that prevents it from being displayed for the user. Yet, in particular contexts, this keyword may have a heightened level of relevance for that particular user.

Accordingly, in this embodiment, a multiplier is determined for identified keywords based on the relevance of the individual keywords relative to email messages that have been received by the user. The multiplier determines how much the keyword weight will increase if contact cross-indexing finds a high correlation of a particular keyword in messages that the user has received.

Thus, in this embodiment, for all keywords, all messages that have that keyword are located. These messages can include any messages that the user has received. Once these messages are located, for each keyword, a ratio is determined and describes how that keyword appears in that particular set of messages. That is, some messages may have a high occurrence of the keyword and thus its weight in that message may be high. In other messages, the keyword may have a low occurrence and thus a low weight. From these messages and weights a multiplier is derived and used to increase or decrease the weight of the associated keyword in the context of the current message.

In some embodiments, email messages such as junk or other categories (such as deleted) can be excluded from the analysis.

Finding Words to Combine

There are some words which, by themselves, are less interesting than when they occur with other words. Accordingly, in at least some embodiments, keywords can be combined to form multi-word phrases which are then used for searching to return more relevant search and ad results. As an example, consider the following.

Assume in the relevant system, the keyword extractor generates five top keywords. Typically, the top keyword will automatically be selected as the one that serves as the basis of the search that is conducted. However, if the keyword selected for the ads search is too broad, the results may likely not be of interest to the user. For example, if an email message's top five keywords include "union" and "wages", each one standing alone can be too broad. However, if the two words are combined to form the phrase "union wages", this phrase may generate a search having results that are much more relevant to the particular user. In this embodiment, words can be combined when the intersection of the two words targets the meaning of the email message and/or the words are more relevant when combined.

In one embodiment, the relevance of a combination of words is ascertained by first combining the words and then ascertaining whether that combination is a common search term as by comparing the combination with a keyword list maintained by a server, such as keyword list 110*b* (FIG. 2). In many instances, the order of the words can be important and the order should be chosen by determining which has a higher rate of search. Each keyword permutation can be combined, and then the combination with the highest likelihood of constituting a search phrase can be chosen as the best match.

To determine if a particular keyword phrase should be used or not used, a ratio of weights can be determined between each of the separate keywords and the combined keyword. If the ratio is above a certain threshold, then the combined keyword can be determined to be of value and can replace or augment an existing keyword.

In at least some embodiments, noun/verb/adjective patterns can be used to determine the best order. For example, the order "<Verb> <Noun>" (Example "Ski whistler") or "<Noun> <Verb>" (Example: "Hawaii Surfing") may be appropriate.

Furthermore, so called stemming (i.e., "ing" versus "er") can be used to determine the best order as well. That is, in some instances, it may be desirable to utilize stemming changes to find good matches. For example "Hawaii" and "hotel" might be combined to form "Hawaii hotels", or "horseback" and "ride" might be combined to form "horseback riding".

In at least some embodiments, the percent difference in weights between the top keyword and the subsequent keywords can help to determine if keywords should be combined.

In at least some embodiments, when multiple words are combined, certain sub-combinations can be enclosed in single quotations to allow for exact matches, an example of which is provided just below.

Some examples of keywords that can be combined to provide better keywords include, by way of example and not limitation:

"union" & "wages" → "union wages";
"aruba" & "scuba diving" → "'aruba scuba' diving";
"Hawaii" & "hotels" → "Hawaii hotels"
"fees" & "Yellowstone national park" → "'Yellowstone national park' fees"; and
"Cisco Corp" & "Chairman" → "'Cisco Corp' Chairman".

Detecting Keywords that are Locations

In at least some embodiments, if a location is mentioned in an email message, it may constitute a relevant keyword that should form the basis of a search. By using detected locations, better quality search results and supplemental information can be presented to the user. As an example, consider the following.

In some instances, locations can be used to help combine keywords in a better way. For example, if two of the top ten keywords are locations, then the email may likely be about traveling from one location to the other. This, in turn, may make certain combinations of words more relevant than others. Further, keywords associated with a type of travel can be identified and used to fine tune the keywords that are used. Types of travel can include: car, train, plane, boat, cruise ship, hiking, cycling, and motorcycle riding.

In at least some embodiments, a detected location can be used to select and display a map of that location instead of or in addition to the keyword. Further, with two detected locations, the map may include both locations—one as a source location and the other as a destination location along with driving directions. In some instances, the user's "Me" contact can be used to display the user's home location relative to other locations that are detected in the email message.

In some instances, phrases such as "car rental", "taxi", "hotel", "tourist", "bus", may be more relevant to locations away from the user's home. This, in turn, can be used to determine how to combine these keywords with the non-home location instead of the home location.

Further, airport codes such as "LAX" (Los Angeles International) and "CCD" (Los Angeles Century City) can be used to identify location, travel type, and data to provide any maps which might be shown to the user.

Examples of locations and the way in which such can drive word combinations include:

"Hospital", "Seattle" → "Seattle Hospital";
"Tennis", "Atlanta GA" →"Tennis 'Atlanta, G'";
"Hotel", "Las Vegas" → "Hotel 'Las Vegas'"; and
"Airport", "London", "London Airport".

Rating Keywords

In at least some embodiments, individual users can have the opportunity to rate keywords. Keyword ratings can be used for a couple of different purposes. First, from a general standpoint, keyword ratings can provide information that is useful for understanding which keywords are generally useful for a group of users. Second, from a specific standpoint, keyword ratings can be utilized to understand which keywords are useful for particular individual users. Keyword ratings for individual users can also lead to an understanding or appreciation of category preferences for a particular user.

Any suitable keyword rating system can be used. For example, users might assign a rating from one to five stars to a particular keyword. Once keywords have been rated, their individual weights can be adjusted accordingly. In addition, when the user votes, the top N number of keywords and their particular weights, votes and the like can be uploaded to the server and used accordingly.

Using URLs and Email Domains to Add, Remove, Promote or Demote Keywords

Domain names from email addresses or URLs for web sites can provide data that generates good keywords. Accordingly, in at least some embodiments, domain names and/or URLs can be used as keywords. For example, some domain names might be initials, such as IBM.com, UCLA.edu, NRA.com. In this case, using "IBM" as a keyword may be useful to a user. Other domain names might constitute single words that could be valuable to a particular user, e.g. whistler.com, cooking.com, stocks.com. When such a domain name is found, it can be compared with a keyword list, such as list 110b (FIG. 2) to ascertain whether it is a common search term.

Domain names can also appear as combined names. In this case, the domain name can be broken into the separate words and the separate words can be processed to ascertain whether they constitute good keywords. This can be done, for example, by iterating through the domain name and trying to insert a space. A word can be found by matching the proposed word before the space with words in a keyword list or by using a spell checking dictionary. Additionally, the use of upper and lower case letters may also indicate a logical word break. This can be used to find many words in a domain name such as, for example, ResumesWriters.com, HotJobs.com, PetSmart.com, PriceGrabber.com, CitySearch.com, CruiseDeals.com, TheWorldCruiseShip.com, PriceLine.com, CruiseLineJobs.com, ShipJobs.com, RoyalCaribbean.com, and CharlesSchwab.com.

Removing Signatures or Taglines

A common source of errors in keyword extraction for email comes from what are known as "tag lines". Tag lines are short (typically 2-4) line pieces of text appended to email by free email systems. They are typically advertisements for a service provided by the email system, or an affiliate, or the like. Words in these taglines are disproportionately likely to be selected by keyword extraction systems for a few reasons. First, since the ads are usually untargeted, they tend to target popular terms like sports or weather. These are the same types of terms that have high frequency in query log files, which is usually a good indicator that a term is important, and a key input to our term extraction system. Second, the terms tend to be capitalized, another important input to our system. However, since the terms are usually completely irrelevant to the message (except perhaps by chance), they are particularly poor terms and perhaps even embarrassing to display to a user.

Because messages may be replied to, edited, and the like, tag lines are not always at the end of messages, but may also be internal to messages.

In accordance with one embodiment, a removal process is utilized to remove detected tag lines from consideration. The tag line removal process can be integrated with the other processes described above and below. Any suitable heuristics can be utilized to detect tag lines. As but one example, tag lines can be detected by ascertaining whether there is a line consisting of a string of characters from a set usually used for taglines, e.g. –, =, * and the like. The line may have a minimum length, or perhaps a longer length. In addition, checks can be made to ascertain whether the line is near the end of the message, and/or whether it is followed by some small number of textual lines (e.g., 2-4 lines) followed by either a blank line, or the end of the message.

The same type of processing can also be done to detect and remove signature lines from consideration.

Removing Header Lines

Another common source of errors in email keyword detection is header lines, such as "From:", "To:", "Date:", "Subject:", and the like. For instance, if two people, John Smith and Jane Doe correspond in a long email thread, there may be many lines of the form:

From: John Smith
To: Jane Doe
or
From: Jane Doe
To: John Smith.

Some keyword extraction systems may notice that a word like "John" occurs multiple times in the message. "John" is also a capitalized word, which is a useful indicator for keyword extraction. The system may thus extract the word "John" as a keyword. However, "John" is not a particularly good keyword. In the present context, he is simply someone with whom there has been correspondence.

Similar problems can occur with, for example, date lines which can appear as:

Date: June 10, 2006

In a long email thread over the course of a month, the "Date" may occur several times, and "June" might be detected as a useful keyword. A similar problem can happen for subject lines, which can again be included many times in the message in a long email thread.

In accordance with at least one embodiment, it is therefore useful to remove header lines before performing keyword extraction. Header lines can be detected using a number of different heuristics. For example, header lines will always tend to be of a similar or predictable form, e.g. "X: y" for some single word "X" and some sequence of words "y". Header lines may occur at the beginning of the line, or, if a thread has included an email reader that preferences replies with other characters like ">", they may be preceded by one or more characters commonly used for this purpose (like ">"). In accordance with one embodiment, a fixed list of common values for X (e.g., "Subject", "Date", "From", "To") can be used, as well as their translations into other languages. Alternately or additionally, an assumption can simply be made that lines meeting the preceding heuristic are indeed header lines and can be removed.

Duplicate Removal

In a keyword extraction system that presents a list of keywords to a user, e.g. as options for searching, it can be desirable to display a relatively succinct list. For instance, it may not be desirable to suggest that the user search for both "Bank of America" and "BankOfAmerica.com". Similarly, it may not be desirable to suggest that the user search for both "Big Dog" and "Big Dogs". In order to mitigate this problem, a number of different types of heuristics can be utilized, examples of which are provided just below:

First, if a string X and a string XY are both on the list of possible return values for display, then only the longer string might be returned for display. Alternately or additionally, if a return string is composed of words X1, X2 . . . XN and another return string is composed of words Y1, Y2, . . . YN, such that X1 . . . XN are respectively similar to Y1 . . . YN, then only one of the strings might be returned. Similarity can be defined in a number of ways, e.g. by "stemming" the Xs and the Ys (e.g. hitting→hit and hits→hit). Alternately or additionally, both can be truncated to a fixed number of letters, e.g. the first six letters (elephant and elephants→elepha). Alternately or additionally, an edit distance can be computed between them or a number n can be computed which is p percent of the length of the longer word, and if the first n characters are the same, the words can be considered similar.

In addition, as alluded to above, these methods can be combined, e.g. if X1 X2 . . . Xa is a return string, and Y1 Y2 . . . Yn is a return string and a<n and X1 . . . Xa are similar to Y1 . . . Ya, then only the longer string might be returned.

Re-calculating Weights for Detected Keywords Re-occurring Over a Pre-determined Temporal Domain In certain situations such as email threads, automated emails from subscriptions and the like, the same keywords can appear in relatively consecutive emails. It is likely that if the user has encountered a keyword relatively shortly in the past, that they may not be interested in its reoccurrence in the immediate future. Accordingly, in at least some embodiments, if the same keywords are found in any of the last configurable N number of emails (e.g. 20), the weights of the extracted keywords, especially if previous advertisements have been shown for that particular keyword, can be modified or lowered. This will cause other keywords to bubble to the top of the list.

In addition, keywords such as these can be removed from the extracted list if users have indicated, via voting, that such keywords are not useful.

Adding a Feedback Loop to Extracted Keywords to Increase Yield

In some embodiments, a feedback loop can be utilized to temporarily suppress keywords. For example, keywords can be tracked and if they do not result in sponsored ads at all, such keywords can be suppressed for a period of time. For example, if a keyword is identified as a potentially suppressible keyword, if such keyword occurs again within a day or within the last N number of emails (e.g. 20), then the keyword can be suppressed completely or re-weighted so that other keywords with higher yields can be used. This can compensate for dynamic changes in the ad inventory and increase yield.

Alternately or additionally, keywords that result in ads that have been voted as poor by users can be tracked. If those keywords occur again within a day or within the last N number of emails (e.g. 20), then the keywords can be suppressed completely or re-weighted so that other keywords with higher yields can be used.

Alternately or additionally, if extracted keywords result in ads with a high click-thru or high relevancy vote, then their corresponding weights can be increased if they occur again within a predetermined time or within the last N number of emails (e.g. 20). This can compensate for any short term interests expressed by the user and increase yield. This approach can also be used to find other 'adjacent' or related keywords whose weights can be increased accordingly. This can compensate for any short term interests expressed by the user and increase yield.

Detecting Keywords that are Phone Numbers

In at least some embodiments, phone numbers can be detected and used as keywords. Such numbers can be used for a couple of different purposes. First, such phone numbers can be used as search terms where, for example, search results that indicate the phone number's geographic locale might be displayed. Second, if a phone number is detected, a user can be allowed to initiate a VOIP or PSTN-in call to that number by automatically clicking a call button icon that appears as part of the user interface.

Displaying Ads Based on Demographic/user Profile and Friends Interests

In at least some embodiments, ads can be displayed based on ads that an individual's buddies (i.e. from a buddy list) or friends (i.e. from a contact list) are clicking on in their own email clients. In this embodiment, the server can correlate ad click thru based on a network feedback system. This can utilize a separate opt-in or notification for the individual and his or her friends.

Display ads can also be based on user profile/demographics. For example, displayed sponsored links may not be keyword driven in the event there are no good keywords and/or ads based on the found keywords are not especially relevant. As an example, in such a situation, the system might show an ad for 'Seattle SeaHawks' memorabilia if the profile for the user indicated that they are male, under 40 and live in the Seattle area code.

CONCLUSION

Various embodiments can utilize information that is displayed for a user to automatically generate a list of keywords and use that list as a means to display supplemental information that is relevant to the keywords. In at least some embodiments, the displayed information is analyzed using an extraction algorithm to identify words or, more generally, character strings of interest. If these words or character strings of interest are determined to constitute relevant search terms or "keywords", then a special user interface portion can be used to display this supplemental information along with the information that is already displayed for the user. This supplemental information can include the search terms themselves, ads that pertain to the search terms, and/or search results that have been ascertained from a web search engine. Using the displayed search terms, at least some embodiments can allow a user to click on a different search term to automatically display a new set of supplemental data, such as new ads or search results that pertain to the term on which the user clicked. Accordingly, the inventive embodiments can greatly enhance the user's experience.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising computer-executable instructions, the method comprising:
   accessing information that a user is currently working with, wherein the information that the user is currently working with comprises at least one of a current email application, a currently browsed web page, a current instant message, or a current RSS feed the user is browsing;
   extracting one or more keywords from the information, by utilizing term frequency-inverse document frequency techniques to identify keywords;
   suppressing one or more extracted keywords by utilizing a feedback loop, wherein the feedback loop enables the one or more keywords to be suppressed for a period of time when the one or more keywords fail to result in a sponsored ad;

calculating a term frequency by dividing a number of occurrences of a word or a collection of words by a number of occurrences of terms in the information that the user is currently working with;

calculating an inverse document frequency by calculating a logarithm of the number of documents divided by the number of documents containing an identified keyword;

calculating the term frequency-inverse document frequency by multiplying the term frequency by the inverse document frequency;

determining the identified keyword based in part on a high weight in the term frequency-inverse document frequency;

ascertaining whether the keywords likely constitute search terms, wherein the act of ascertaining comprises performing one or more of: removing one or more tag lines, or removing one or more header lines;

based at least in part on said ascertaining, displaying selected keywords for the user; and displaying supplemental information that is related to at least one displayed keyword, wherein the acts of displaying selected keywords and supplemental information comprise displaying the selected keywords and the supplemental information alongside the information that the user is currently working with.

2. The method of claim 1, wherein the acts of displaying selected keywords and supplemental information comprise displaying selected keywords and supplemental information along side the information that the user is currently working with, wherein the act of displaying selected keywords comprises removing duplicate words that are found to be similar.

3. The method of claim 1, wherein the act of displaying selected keywords comprises removing duplicate words that are found to be similar.

4. The method of claim 1, wherein the act of displaying supplemental information comprises using selected keywords to conduct a web search and displaying search results from the web search.

5. The method of claim 1, wherein the act of displaying supplemental information comprises using selected keywords to conduct an ad search and displaying ad search results from the ad search.

6. The method of claim 1, wherein the act of displaying supplemental information comprises:
using selected keywords to conduct a web search and displaying search results from the web search; and
using selected keywords to conduct an ad search and displaying ad search results from the ad search.

7. The method of claim 6, wherein the acts of displaying selected keywords and supplemental information comprise displaying said selected keywords and supplemental information along side the information that the user is currently working with, wherein the act of displaying selected keywords comprises removing duplicate words that are found to be similar prior to display.

8. A computer-implemented method comprising:
executing instructions stored on a computer-readable media, wherein the instructions when executed on a processor comprise;
presenting a user interface in which a user can view email messages;
responsive to the user selecting an email message, displaying one or more keywords found in the email message, wherein the act of displaying comprises:
removing one or more of email tag lines or email header lines from consideration as a keyword;
cross-indexing one or more keywords from a selected email message with other email messages that pertain to a contact from which the selected email message was received, to ascertain the use of a multiplier with a weight associated with the cross-indexed one or more keywords;
re-calculating weights for detected keywords that re-occur over a pre-determined temporal domain such that the weights of the detected keywords found in last N configurable emails are modified or lowered;
using the one or more keywords to conduct a search that provides search results;
displaying the search results for the user; and
displaying supplemental information that is related to at least one displayed keyword, wherein the acts of displaying selected keywords and supplemental information comprise displaying the selected keywords and the supplemental information.

9. The method of claim 8, wherein the search comprises an ad search.

10. The method of claim 8, wherein the search comprises a web search using a web search engine and an ad search.

11. The method of claim 8, wherein the search results and the keywords are displayed along side the selected email message.

12. The method of claim 8 further comprising changing the displayed search results responsive to a user selecting a keyword that is different from a keyword associated with the first-displayed search results.

13. The method of claim 8, wherein the keywords comprises personal names.

14. The method of claim 8, wherein the act of displaying one or more keywords comprises combining keywords and using combined keywords to conduct the search.

15. The method of claim 8, wherein the keywords comprises locations.

16. The method of claim 8, wherein the keywords are rated by users.

17. The method of claim 8, wherein the act of displaying keywords comprises re-calculating weights for detected keywords that re-occur over a pre-determined temporal domain.

* * * * *

UNITED STATES PATENT AND TRADEMARK OFFICE
CERTIFICATE OF CORRECTION

| | | |
|---|---|---|
| PATENT NO. | : 7,664,740 B2 | Page 1 of 1 |
| APPLICATION NO. | : 11/426509 | |
| DATED | : February 16, 2010 | |
| INVENTOR(S) | : Bryan T. Starbuck et al. | |

It is certified that error appears in the above-identified patent and that said Letters Patent is hereby corrected as shown below:

In column 14, line 4, in Claim 8, delete "comprise;" and insert -- comprise: --, therefor.

Signed and Sealed this
Eighth Day of February, 2011

David J. Kappos
*Director of the United States Patent and Trademark Office*